US011912022B2

(12) United States Patent
Landa et al.

(10) Patent No.: US 11,912,022 B2
(45) Date of Patent: Feb. 27, 2024

(54) APPARATUS FOR CONTROLLING TENSION APPLIED TO A FLEXIBLE MEMBER

(71) Applicant: LANDA CORPORATION LTD., Rehovot (IL)

(72) Inventors: Benzion Landa, Nes Ziona (IL); Shay Geron, Ganei Tikva (IL); Zohar Goldenstein, Nes Ziona (IL)

(73) Assignee: LANDA CORPORATION LTD., Rehovot (IL)

( * ) Notice: Subject to any disclaimer, the term of this patent is extended or adjusted under 35 U.S.C. 154(b) by 187 days.

(21) Appl. No.: 17/635,713

(22) PCT Filed: Aug. 16, 2020

(86) PCT No.: PCT/IB2020/057710
§ 371 (c)(1),
(2) Date: Feb. 16, 2022

(87) PCT Pub. No.: WO2021/033121
PCT Pub. Date: Feb. 25, 2021

(65) Prior Publication Data

US 2022/0281219 A1 Sep. 8, 2022

Related U.S. Application Data

(60) Provisional application No. 62/889,069, filed on Aug. 20, 2019.

(51) Int. Cl.
*B41J 2/005* (2006.01)
*B41J 2/01* (2006.01)

(52) U.S. Cl.
CPC ........ *B41J 2/0057* (2013.01); *B41J 2002/012* (2013.01)

(58) Field of Classification Search
CPC ....... B41J 2/0057; B41J 2002/012; B41J 2/01
See application file for complete search history.

(56) References Cited

U.S. PATENT DOCUMENTS

| | | | |
|---|---|---|---|
| 4,172,231 | A | 10/1979 | D'alayer De Costemore D'arc et al. |
| 5,230,456 | A | 7/1993 | Germann et al. |
| 5,246,155 | A | 9/1993 | Barrois |
| 5,285,244 | A | 2/1994 | Bujese |
| 5,433,541 | A | 7/1995 | Hieda et al. |

(Continued)

FOREIGN PATENT DOCUMENTS

| | | |
|---|---|---|
| CN | 208290747 U | 12/2018 |
| EP | 2213601 A1 | 8/2010 |

(Continued)

OTHER PUBLICATIONS

JP2007279639A Machine Translation (by EPO and Google)—published Oct. 25, 2007; Ricoh Printing Sys Ltd.

(Continued)

*Primary Examiner* — Bradley W Thies

(74) *Attorney, Agent, or Firm* — Kligler & Associates Patent Attorneys Ltd.

(57) ABSTRACT

A digital printing system (10) includes a flexible intermediate transfer member (ITM) (44) and a dancer assembly (100). The ITM (44) is configured to receive ink droplets from an ink supply system to form an image thereon, and to transfer the image to a target substrate (50). The dancer assembly (100) includes a fluid chamber (103) and a rotatable element (111) fitted in the fluid chamber (103), the fluid chamber (103) includes an inlet (107) configured to receive pressurized fluid (130) into the fluid chamber (103), and the pressurized fluid (130) causes the rotatable element (111) to move relative to the fluid chamber (103) and to apply tension to the ITM (44) while being rotated by the ITM (44).

20 Claims, 5 Drawing Sheets

(56) References Cited

U.S. PATENT DOCUMENTS

| | | | | |
|---|---|---|---|---|
| 6,605,919 | B1 | 8/2003 | Branecky | |
| 7,004,220 | B1 * | 2/2006 | Rasmussen | B41F 16/02 101/216 |
| 9,186,884 | B2 | 11/2015 | Landa et al. | |
| 9,229,664 | B2 | 1/2016 | Landa et al. | |
| 9,290,016 | B2 | 3/2016 | Landa et al. | |
| 9,327,496 | B2 | 5/2016 | Landa et al. | |
| 9,914,316 | B2 | 3/2018 | Landa et al. | |
| 2003/0049065 | A1 | 3/2003 | Barrus et al. | |
| 2003/0153419 | A1 | 8/2003 | Hodjat et al. | |
| 2004/0124831 | A1 | 7/2004 | Micke et al. | |
| 2008/0283567 | A1 | 11/2008 | Yang | |
| 2009/0196670 | A1 | 8/2009 | Mcnestry et al. | |
| 2013/0033554 | A1 | 2/2013 | Bouverie et al. | |
| 2014/0104360 | A1 | 4/2014 | Hacker et al. | |
| 2014/0132698 | A1 | 5/2014 | Lakin | |
| 2014/0225970 | A1 | 8/2014 | Lakin | |
| 2015/0054865 | A1 | 2/2015 | Landa et al. | |
| 2015/0118503 | A1 | 4/2015 | Landa et al. | |
| 2017/0008272 | A1 | 1/2017 | Landa et al. | |
| 2019/0047298 | A1 | 2/2019 | Hashimoto et al. | |
| 2019/0152218 | A1 | 5/2019 | Stein et al. | |
| 2021/0252876 | A1 | 8/2021 | Landa et al. | |

FOREIGN PATENT DOCUMENTS

| | | | |
|---|---|---|---|
| EP | 3251989 | A1 | 12/2017 |
| JP | H05100579 | A | 4/1993 |
| JP | 2007279639 | A | 10/2007 |
| JP | 2009234219 | A | 10/2009 |
| WO | 2013132424 | A1 | 9/2013 |
| WO | 2013132438 | A2 | 9/2013 |
| WO | 2017208152 | A1 | 12/2017 |
| WO | 2019012456 | A1 | 1/2019 |
| WO | 2019106510 | A1 | 6/2019 |
| WO | 2020136517 | A1 | 7/2020 |

OTHER PUBLICATIONS

JP2009234219 Machine Translation (by EPO and Google)—published Oct. 15, 2009; Fujifilm Corp.

JPH05100579A Machine Translation (by EPO and Google)—published Apr. 23, 1993; Olin Corp.

Evonik Industries, "Rohacell", Product Information, pp. 1-2, Aug. 2017, as downloaded from https://www.rohacell.com/en.

Rogers Corporation, "Poron 4701-30 Polyurethane", Product Information, pp. 1-3, year 2020, as downloaded from https://rogerscorp.com/elastomeric-material-solutions/poron-industrial-polyurethanes/poron-4701-30.

International Application PCT/IB2020/057710 Search report dated Dec. 3, 2020.

CN208290747U Machine Translation (by Google Patents)—published Dec. 28, 2018; Nanjing Hanqian Digital Tech Co Ltd.

International Application # PCT/IB2022/050328 Search Report dated May 16, 2022.

* cited by examiner

APPARATUS FOR CONTROLLING TENSION APPLIED TO A FLEXIBLE MEMBER

CROSS-REFERENCE TO RELATED APPLICATIONS

This application is U.S. National Phase of PCT Application PCT/IB2020/057710, filed Aug. 16, 2020, which claims the benefit of U.S. Provisional Patent Application 62/889,069, filed Aug. 20, 2019. The disclosures of these related applications are incorporated herein by reference.

FIELD OF THE INVENTION

The present invention relates generally to digital printing systems, and particularly to methods and systems for applying tension to a flexible intermediate transfer member of a digital printing system.

BACKGROUND OF THE INVENTION

Various techniques have been developed to guide flexible substrates in printing systems.

For example, U.S. Pat. No. 5,246,155 describes a web guide roller assembly for a printing machine utilizes a cylindrical roller support body and a concentric hollow roller body.

SUMMARY OF THE INVENTION

An embodiment of the present invention that is described herein provides a digital printing system, including a flexible intermediate transfer member (ITM) and a dancer assembly. The ITM is configured to receive ink droplets from an ink supply system to form an image thereon, and to transfer the image to a target substrate. The dancer assembly includes a fluid chamber and a rotatable element fitted in the fluid chamber, the fluid chamber includes an inlet configured to receive pressurized fluid into the fluid chamber, and the pressurized fluid causes the rotatable element to move relative to the fluid chamber and to apply tension to the ITM while being rotated by the ITM.

In some embodiments, the system includes a processor, which is configured to control movement of the rotatable element, including: (i) choosing between at least a first position and a second position of the dancer assembly, (ii) in the first position, moving at least the fluid chamber relative to the ITM, and (iii) in the second position, moving at least the rotatable element relative to the fluid chamber. In other embodiments, the system includes a fluid compressor, which is configured to supply the pressurized fluid into the fluid chamber through the inlet. In yet other embodiments, the system includes a processor, which is configured to: (a) calculate, based on an indication of the tension applied to the ITM, a target pressure that, when applied to the pressurized fluid, causes the rotatable element to apply the tension to the ITM, and (b) control the fluid compressor to supply the pressurized fluid at the target pressure, into the fluid chamber.

In an embodiment, the system includes a pressure sensor, which is configured to produce a pressure signal indicative of a present pressure of the pressurized fluid in the fluid chamber. and the processor is configured, based on the pressure signal, to control the fluid compressor to match the present pressure to the target pressure. In another embodiment, the pressurized fluid includes pressurized air, and the fluid compressor includes an air blower, configured to supply the pressurized air. In yet another embodiment, the system includes a position sensing assembly, which is configured to produce a position signal indicative of a position of the rotatable element relative to a predetermined reference point.

In some embodiments, the processor is configured, based on the position signal, to control the motor to move at least the fluid chamber relative to the ITM. In other embodiments, based on the position signal, the processor is configured to control the fluid compressor to move at least the rotatable element along an axis of the fluid chamber by controlling a pressure of the pressurized fluid. In yet other embodiments, the rotatable element includes a roller.

In an embodiment, the roller has a circular cross-section. In another embodiment, the rotatable element includes at least one material selected from a material list of consisting of (a) carbon, (b) polymethacrylimide (PMI), and (c) perfluoroalkoxy alkanes (PFA). In yet another embodiment, the PMI is shaped as a rigid foam.

In some embodiments, the PFA is shaped as a tube. In other embodiments, the system includes a motor, which is configured to move at least the fluid chamber relative to the ITM, and at least in the first position, the processor is configured to control the motor to move at least the fluid chamber relative to the ITM. In other embodiments, the system includes an opening, which is sized and shaped to fit snugly over the rotatable element, and the pressurized fluid causes the rotatable element to protrude from the fluid chamber via the opening. In yet other embodiments, the system includes a seal, which is coupled to the opening, and is configured to hold the pressurized fluid within the fluid chamber when a pressure of the pressurized fluid is smaller than or equal to a predefined pressure, and to release at least part of the pressurized fluid out of the fluid chamber when the pressure exceeds the predefined pressure.

In an embodiment, the seal is configured to reduce friction between the rotatable element and walls of the opening. In another embodiment, the seal includes at least an element selected from a list consisting of a sponge and a tape. In yet another embodiment, the tape is bonded to a surface of the sponge.

In some embodiments, the sponge includes polyester. In other embodiments, the tape includes an ultra-high molecular weight (UHMW) polyethylene. In yet other embodiments, the seal includes a leaf spring having first and second sections, the first section is coupled to a wall of the opening, and the second section is configured to release at least part of the pressurized fluid out of the fluid chamber by moving relative to the rotatable element.

In an embodiment, the second section is configured to move in response to a change in a position of the rotatable element. In another embodiment, the leaf spring includes stainless steel, and in response to a change in a position of the rotatable element, the second section is configured to bend relative to the first section. In yet another embodiment, the second section includes one or more elements selected from a list consisting of a sponge and a tape.

In some embodiments, the tape is bonded to a surface of the sponge. In other embodiments, the sponge includes polyurethane foam. In yet other embodiments, the tape includes an ultra-high molecular weight (UHMW) polyethylene or polytetrafluoroethylene (PTFE).

In some embodiments, the sponge is coupled to the second section and the tape is coupled to the sponge, and in response to a change in a position of the rotatable element, the second section is configured to move relative to the rotatable element so as to maintain a distance between the tape and an outer surface of the rotatable element. In other embodiments, the pressurized fluid causes the rotatable element to move along an axis of the fluid chamber, and at a point of contact between the ITM and the rotatable element, the axis of the fluid chamber is orthogonal to a movement axis of the ITM.

There is additionally provided, in accordance with an embodiment of the present invention, a method, including in a digital printing system that includes (a) a flexible intermediate transfer member (ITM), and (b) a dancer assembly, that includes a fluid chamber and a rotatable element fitted in the fluid chamber, the fluid chamber including an inlet for receiving pressurized fluid into the fluid chamber, applying, by the rotatable element, a tension to the ITM, by supplying the pressurized fluid into the fluid chamber, and causing the rotatable element to move relative to the fluid chamber. An image is formed on the ITM by receiving ink droplets from an ink supply system, and the image is transferred to a target substrate.

There is further provided, in accordance with an embodiment of the present invention, a method, including in a digital printing system that includes (a) a flexible target substrate, and (b) a dancer assembly, that includes a fluid chamber and a rotatable element fitted in the fluid chamber, the fluid chamber including an inlet for receiving pressurized fluid into the fluid chamber, applying, by the rotatable element, a predefined tension to the flexible target substrate, by supplying the pressurized fluid into the fluid chamber and causing the rotatable element to move relative to the fluid chamber. An image is formed on the flexible target substrate by receiving ink droplets from an ink supply system.

There is additionally provided, in accordance with an embodiment of the present invention, an apparatus for controlling tension applied to a flexible member, the apparatus includes a substrate and a dancer assembly. The substrate includes the flexible member. The dancer assembly includes a fluid chamber and a rotatable element fitted in the fluid chamber, the fluid chamber including an inlet configured to receive pressurized fluid into the fluid chamber, the pressurized fluid causes the rotatable element to move relative to the fluid chamber and to apply tension to the substrate while being rotated by the substrate.

The present invention will be more fully understood from the following detailed description of the embodiments thereof taken together with the drawings in which:

DETAILED DESCRIPTION OF EMBODIMENTS

Overview

Figure 1:
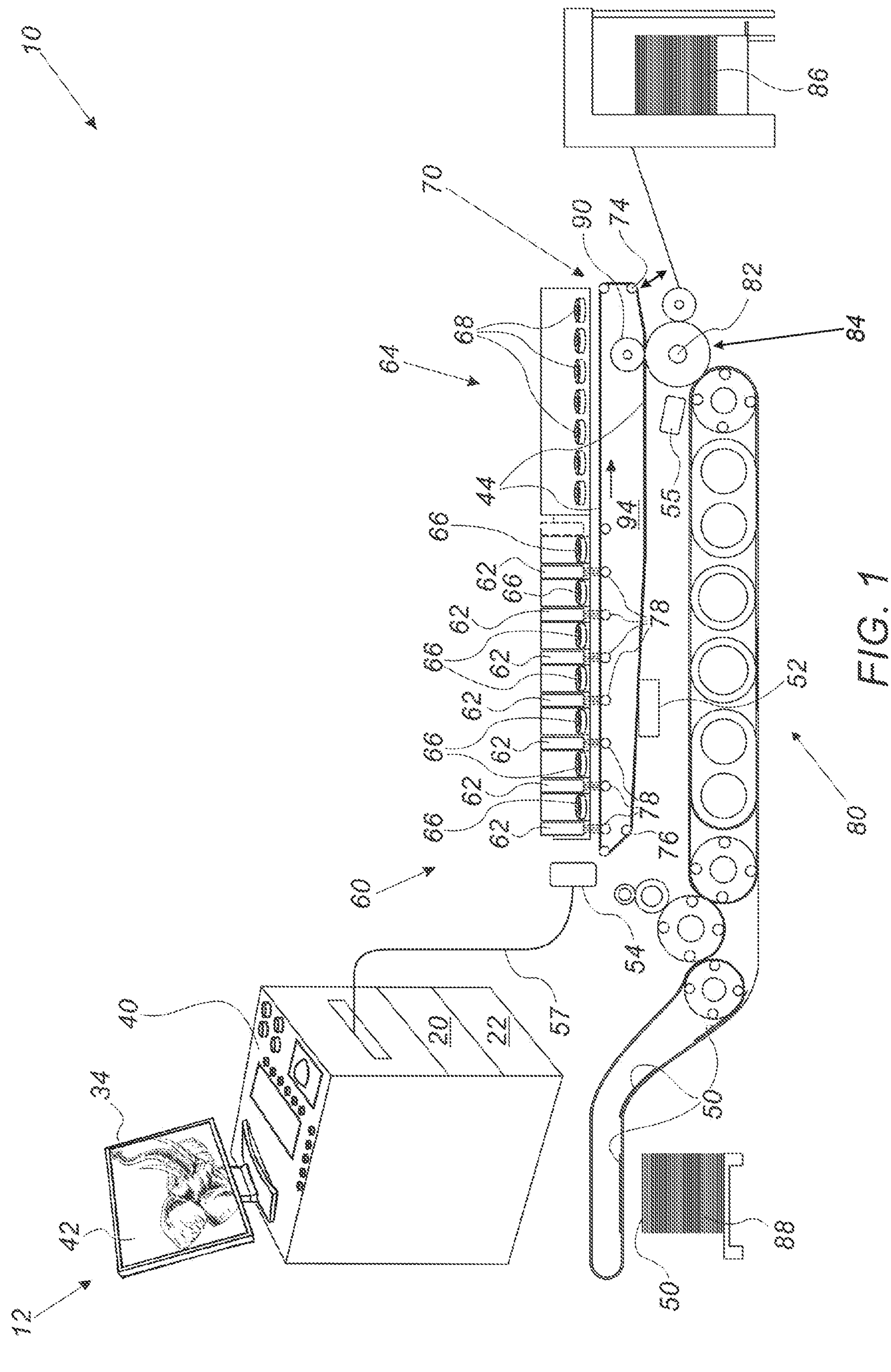
FIG. 1 is a schematic side view of a digital printing system, in accordance with an embodiment of the present invention.

Embodiments of the present invention that are described hereinbelow provide an apparatus for applying controlled tension to a flexible member of a digital printing system, for maintaining the member taut. In some embodiments, the digital printing system comprises a flexible intermediate transfer member (ITM), also referred to herein as a blanket, which is typically made from a multilayered fabric. The ITM is configured to receive ink droplets from an image forming station, so as to form an image thereon, and to transfer the image to a target substrate, such as a sheet or continuous web, at an impression station. It is important to maintain the ITM taut, so as to prevent distortions in the image formation (on the ITM) and transfer (to the target substrate). In principle, it is possible to apply tension to the ITM using a motorized dancer. Such dancer has to be: (a) sufficiently stiff, to hold a uniform tension across the ITM without deflections causing image distortions, therefore such dancers are typically heavy-weight, and (b) sufficiently light-weight to be able to compensate for high-frequency tension changes caused by vibrations that may occur to the ITM during the printing process. This tradeoff may limit the envelop-of-performance of a printing process performed on any type of flexible member.

In some embodiments, the digital printing system comprises an apparatus, referred to herein as a dancer assembly, comprising an air chamber and a light-weight roller fitted in the air chamber. The air chamber comprises an inlet and an opening, which is sized and shaped to fit snugly over the roller. The air dancer comprises a controllable air blower, which is configured to supply pressurized air, via the inlet, into the air chamber. The pressurized air applies a uniform pressure to the roller and moves the roller along a longitudinal axis of the air chamber. As a result, the roller may protrude from the air chamber through the opening, and applies a tension to the ITM while being rotated by the ITM. Note that applying the uniform force allows using the light-weight roller that provides (a) sufficiently-high stiffness, and (b) responsiveness to high-frequency vibrations.

In some embodiments, the dancer assembly comprises a controller, which is configured to receive a signal indicative of a target tension to be applied to the ITM, and based on the signal, to control the rotation speed, typically measured by rounds per minute (RPM), of the air blower to supply the pressurized air at a controllable pressure. In such embodiments, the controller controls the air blower to supply the pressurized air at a pressure that causes the roller to apply the target tension to the ITM.

In some embodiments, the air chamber further comprises a seal, which is coupled to walls of the opening. In an embodiment, the seal makes contact with the roller, in another embodiment, the design of the dancer assembly may incorporate an air gap between the seal and the roller. The seal is configured to hold the pressurized air within the air chamber up to a specified pressure. The seal is also configured to reduce or eliminate friction between the opening and the roller rotated by the ITM, for example, by having the aforementioned air gap between the seal and the roller.

In some embodiments, the dancer assembly comprises a pressure sensor, which is configured to produce a pressure signal indicative of the air pressure within the air chamber. The processor may use the air pressure measurements to control the pressure applied to the pressurized air, for example, by sending to the controller a tension command comprising the aforementioned target tension. Additionally or alternatively, the dancer assembly may comprise a position sensor, which is configured to produce a position signal indicative of the roller position relative to a predetermined reference point, such as the opening of the air chamber. The processor may use the position measurements to control the position of the air chamber, for example, by sending a target position signal to the controller.

In some embodiments, the pressurized-air dancer assembly is configured to substantially isolate the ITM from being affected by mechanical vibrations occurring in the printing system. Moreover, by controlling the air pressure, the dancer assembly is configured to maintain the ITM taut and to assist in moving the ITM at the specified speed when passing adjacent to the image forming station, and when entering the impression station of the digital printing system.

In some cases, the ITM may have high acceleration or deceleration. e.g., due to an immediate stop when the ITM moves (e.g., at 1.7 m/s). In such cases, a heavy-weight (e.g., 20 Kg) dancer assembly may apply excess force to the ITM, which may cause a mechanical damage to the ITM. In some embodiments, the light-weight roller may have a total weight smaller than 500 grams or any other suitable weight, and therefore applies to the ITM less than a tenth of the force applied by the aforementioned heavy-weight dancer assembly.

The disclosed techniques improve the image quality of a digitally printed image, e.g., by reducing image distortions caused by color-to-color and image-to-substrate registrations errors. The improved registration is obtained by improving the stability and uniformity of tension applied to the ITM during the printing process.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown) or as an "image" for brevity, of a digital image 42 on an upper run of a surface of blanket 44. Subsequently the ink image is transferred to a target substrate, (e.g., a paper, a folding carton, a mutilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66 and/or infrared (IR) heaters or and other suitable type of heaters adapted for the printing application. In the example of FIG. 1, air blowers 66 are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference. Embodiments of the dancer assembly are described in detail in FIGS. 2-3, 4A and 4B below.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 (shown, for example, in FIGS. 2 and 3 below) are configured to receive the signals produce by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose computer, with suitable front end and interface circuits for interfacing with controllers of dancer assembly 74 and with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52.

Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (C2C) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software. e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Applying Tension to Blanket Using a Fluid-Based Dancer Assembly

Figure 2:
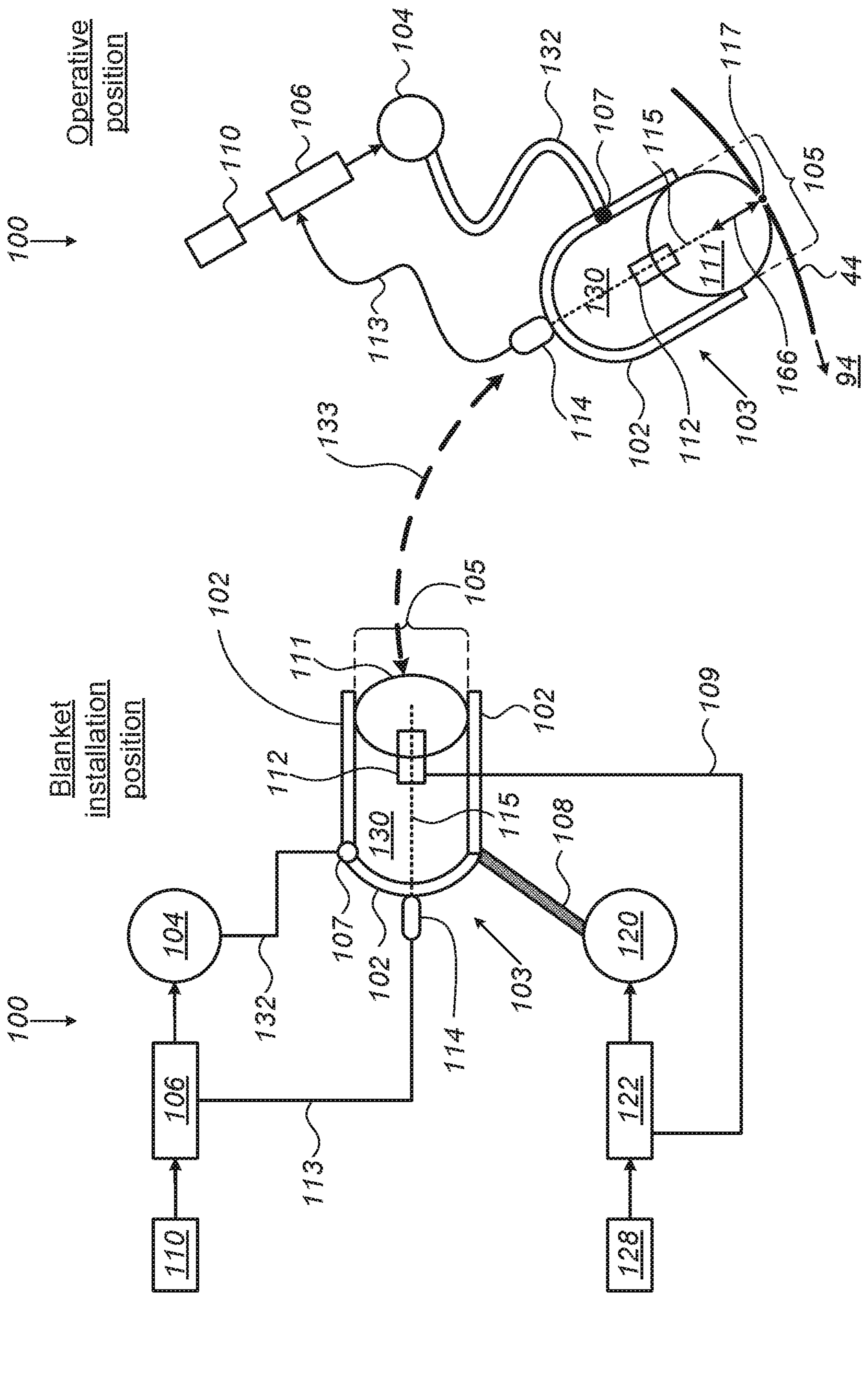
FIG. 2 is a block diagram that schematically illustrates a dancer assembly of a digital printing system, in accordance with an embodiment of the present invention.

FIG. 2 is a block diagram that schematically illustrates a dancer assembly 100, in accordance with an embodiment of the present invention. Dancer assembly 100 may be used for implementing, for example, dancer assembly 74 of FIG. 1 above. In the example of FIG. 2, dancer assembly 100 is shown in two different positions: (a) a blanket installation position, also referred to herein as a first position or a home position, and (b) an operational position, also referred to herein as a second position. Note that system 10 may have additional positions, such as a standby position, which is not shown in FIG. 2, but is described below.

In some embodiments, dancer assembly 100 comprises a fluid chamber, referred to herein as a chamber 103, having a longitudinal axis, referred to herein as an axis 115. In some embodiments, chamber 103 comprises a housing 102 and an inlet 107, which is configured to receive pressurized fluid, in the present example pressurized air 130, via an inlet tube 132, into fluid chamber 103. In other embodiments, the pressurized fluid may comprise any suitable gas, or any suitable liquid or any suitable combination thereof.

In some embodiments, dancer assembly 100 comprises a rotatable element, in the present example a roller 111 having a circular cross-section, fitted in fluid chamber 103. In other embodiments, the rotatable element may comprise one or more balls, a roller having any cross-section other than circular, or any other suitable element adapted to be rotated by blanket 44 as will be described below.

In some embodiments, rotatable element (e.g., roller 111) is made from any suitable light-weight materials, such as but not limited to carbon (e.g., carbon fibers) and a rigid foam comprising polyimethacrylimide (PMI), commercially known as ROHACELL® family of products provided by Evonik industries (Essen, Germany). In some embodiments, the rigid foam may be shaped to form roller 111 using a light-weight shrinkable sleeve comprising perfluoroalkoxy alkanes (PFA) or any other suitable material shaped as a tube to contain the rigid foam, and protect the surface of the foam from abrasion, humidity and reduces friction.

As will be described in detail below, roller 111 is moved by pressurized air, which applies a linear force distributed uniformly along the surface of roller 111. Therefore, roller 111 may comprise the light-weight materials having low friction, such that dancer assembly 100 is configured to apply a stable tension force (e.g., 700 N+/−5 N) to blanket 44, as will be described below. As will be described in detail below the tension force applied to blanket 44 by roller 111 depends on the dimensions of roller 111, e.g., length and diameter, and the pressure applied to roller 111 by the pressurized air.

In some embodiments, chamber 103 comprises an opening 105, which is sized and shaped to fit snugly over roller 111. In the operational position that will be described in detail below, pressurized air 130 causes roller 111 to protrude from chamber 103 via opening 105, and to apply a predefined and controllable tension to blanket 44 while being rotated by blanket 44.

In some embodiments, dancer assembly 100 comprises a position sensing assembly 112, which is configured to sense and produce electrical signals, also referred to herein as position signals, indicative of the position of roller 111 relative to any suitable reference point, such as but not limited to opening 105 or any sort of motion limiter (shown in FIG. 3 below). Position sensing assembly 112 may comprise an optical-based position sensor having optic fibers (shown in FIG. 3 below) or any other suitable type of position sensor.

In other embodiments, position sensing assembly 112 may be mounted on dancer assembly 100 at any other position suitable for sensing the position of roller 111.

In some embodiments, dancer assembly 100 comprises a fluid compressor, in the present example an air blower also referred to herein as a blower 104, which is configured to supply pressurized air 130 into chamber 103 via inlet 107. In other embodiments, dancer assembly 100 may comprise any other suitable type of fluid compressor, configured to apply pressure to any of the aforementioned types of fluid.

In some embodiments, dancer assembly 100 comprises a pressure sensor 114, which is configured to sense the pressure of pressurized air 130 in chamber 103, and to send to processor 20 an electrical signal, also referred to herein as a pressure signal, indicative of the sensed pressure.

In some embodiments, dancer assembly 100 comprises a controller 106, which is configured to receive a tension command 110, e.g., from processor 20. Tension command 110 comprises an electrical signal indicative of a predefined tension, also referred to herein as a target tension, to be applied to blanket 44. Controller 106 is further configured to receive, via a cable 113, the pressure signal produced by pressure sensor 114. In some embodiments, controller 106 may comprise a proportional-integral-derivative (PID) controller having a control loop feedback mechanism, and a driver (not shown), which is configured to drive blower 104.

Reference is now made to the operational position. In some embodiments, roller 111 is brought into physical contact with blanket 44 (as will be described in detail below) and pressurized air 130 applies force to roller 111. In response, roller 111 moves through opening 105, toward blanket 44 in the direction shown by a double-headed arrow 166.

In the example embodiment shown in the operative position of FIG. 2, chamber 103 is designed such that, in response to the force applied by pressurized air 130, roller 111 moves along double-headed arrow 116, which is parallel to axis 115. In an embodiment, when brought into physical contact with blanket 44, roller 111 applies tension, referred to herein as a “roller tension.” to blanket 44.

In some embodiments, at a point of contact (POC) 117 between blanket 44 and roller 111, the movement direction of roller 111 along axis 115 is typically orthogonal to the movement axis of blanket 44, represented by an arrow 94.

Note that blanket 44 and roller 111 may have a contact surface (determined by a wrap angle shown in FIG. 4B below), larger than a single point, such as POC 117. Therefore, POC 117 may be defined as the center of the section of blanket 44 in physical contact with roller 111, or in other words, the center of the wrap angle. In other embodiments, at POC 117 the movement direction of roller 111 may be at any other suitable angle relative to blanket 44.

The illustrated shape of chamber 103 is simplified for the sake of conceptual clarity, and is shown by way of example. In alternative embodiments, chamber 103 may have any other suitable design, such that in response to the force applied by pressurized air 130, roller 111 or any other suitable type of rotatable element, may move in any suitable linear or non-linear trajectory.

In some embodiments, dancer assembly 100 comprises a closed-loop control on the roller tension, also referred to herein as a "pressure loop," using controller 106, blower 104 and pressure sensor 114, as will be described herein.

In some embodiments, controller 106 is configured to calculate the roller tension applied to blanket 44, based on the pressure signal received from pressure sensor 114. Controller 106 is further configured to compare the roller tension with the target tension, which is received from processor 20 in tension command 110. Based on the comparison, controller 106 is configured to adjust the roller tension by controlling the rotational speed of the shaft and blades of blower 104. In other words, controller 106 is configured to determine, based on the target tension, a target pressure to be applied to roller 111 by pressurized air 130.

For example, when the target tension is larger than the roller tension, controller 106 sends a control signal to blower 104 to increase the rotational speed of the shaft and blades of blower 104 so as to increase the air pressure, resulting in an increase of the roller tension applied by the motion of roller 111 toward blanket 44. When the roller tension matches the target tension, controller 106 commands blower 104 to maintain the rotational speed so as to maintain the target tension and the roller tension matched. In this position, roller 111 does not move along arrow 166, but is rotated about its own axis by blanket 44, which moves along the aforementioned blanket movement axis represented by arrow 94.

In other embodiments, processor 20 is configured, based on the pressure signal received from pressure sensor 114, to control the blower 114 to match the present pressure of pressurized air 130 in chamber 103, to the target pressure.

In some embodiments, dancer assembly 100 is configured to absorb shocks caused by any non-linear motion along blanket 44, and to maintain blanket 44 taut when passing adjacent to image forming station 60 and when entering impression station 84.

Note that when system 10 is in the aforementioned standby position, e.g., between printing jobs, blanket 44 does not move but dancer assembly 100 typically remains in the operational position so as to maintain blanket 44 taut.

In some cases, there is a need for replacing blanket 44 and/or for installing a new blanket 44 in system 10. In some embodiments, controller 106 instructs blower 104 to reduce the pressure of pressurized air 130, so as to reduce the roller tension to a value smaller than the target tension. In response to the reduced pressure of pressurized air 130, roller 111 is retracted into fluid chamber 103 and has a substantially smaller protrusion from chamber 103 via opening 105. In other embodiments, roller 111 may be fully contained within chamber 103 without protruding through opening 105.

In some embodiments, dancer assembly 100 comprises a motor 120, such as a stepper motor coupled to a gear having, for example, a ratio of 80:1 or any other suitable ratio. Alternatively, dancer assembly 100 may comprise any other suitable type of motor or motion assembly with or without a gear. The motion assembly may comprise control-enabling features, such as, but not limited to, encoders.

In some embodiments, dancer assembly 100 further comprises a motor controller, referred to herein as a controller 122, which is configured to receive the position signals produced by position sensing assembly 112 via a cable 109. Controller 122 may comprise a PID controller having any suitable type of control loop feedback mechanism, and a driver (not shown), which is configured to drive motor 120.

In some cases, the movement of blanket 44 (e.g., during the printing process) may cause vibrations that may affect the target tension to be applied to the blanket in the operational position. For example, as described in FIG. 1 above, impression station 84 periodically engages and disengages between blanket 44 and impression cylinder 82, which may contribute to the aforementioned vibrations.

In some embodiments, controller 106 is configured to maintain the pressure that positions roller 111 at a given position that applies the desired tension force to blanket 44. In response to a change in the tension that is applied to blanket 44 by any assembly (other than dancer assembly 100) of system 10, roller 111 moves relative to the given position, so as to compensate for the change in tension. For example, in response to a vibration in system 10, roller 111 may move at an amplitude of about 0.8 mm every 20 milliseconds so as to compensate for this vibration.

In other embodiments, controller 106 is configured to oscillate roller 111 over a predefined interval (e.g., 0.3 mm-0.8 mm) at an exemplary frequency of 40 hertz (or any other suitable frequency) so as to maintain constant tension applied to blanket 44, thereby to compensate for any vibrations occurred to blanket 44. This vibration compensation mechanism may reduce the need to move the entire structure of chamber 103 at relatively high frequencies. In such embodiments, controller 122 further comprises (or is electrically coupled to) circuitry (not shown), which may serve as a low-pass (LP) filter for target position signals 128 received from processor 20.

In some embodiments, dancer assembly 100 comprises a closed-loop control on the position of chamber 103, also referred to herein as a "position loop," using controller 122 and motor 116, as will be described herein.

Reference is now made to the blanket installation position. In some embodiments, motor 120 is physically coupled to chamber 103, via an arm 108, and is configured to move chamber 103 in a direction represented by a double-headed arrow 133. In the example of FIG. 2, motor 120 is configured to move chamber 103 in an arcuate motion shown by arrow 133. The arcuate motion velocity may be controlled by controller 122 using any suitable velocity, such as in the range of 3-5 cm/sec and depends on the arc radius, determined by the length of arm 108 (e.g., 63 cm). The motion velocity may be constant along arrow 133, or may change with the distance from blanket 44.

In other embodiments, chamber 103 may be moved by any suitable motion assembly using any other suitable motion profile (e.g., linear).

In the example of FIG. 2, blower 104 and controller 106 are moved together with chamber 103, position sensing assembly 112 and sensor 114. In alternative embodiments, motor 120 may move only chamber 103, position sensing assembly 112 and sensor 114, whereas at least one of inlet tube 132 and cable 113 are sufficiently long and flexible to retain other parts, such as blower 104 and controller 106, in their respective positions shown, schematically, in the blanket installation position.

Note that by having the position loop and pressure loop described above, processor 20 is configured to control, respectively, coarse and fine motion of roller 111 relative to blanket 44. In other words, the position loop moves chamber 103 and roller 111, as a rigid body, relative to blanket 44, and the pressure loop adjusts solely the position of roller 111 relative to blanket 44.

As described above, roller 111 is made from light-weight materials, such as the rigid PMI-based foam contained in a PFA-based tube. The light weight of roller 111 may prevent mechanical damage to blanket 44 in case of high acceleration or deceleration of blanket 44. For example, in case of an emergency stop of blanket 44 moving at an exemplary speed of 1.7 m/s, or at any other speed suitable for digital printing.

In some embodiments, the light-weight of roller 111 induces low inertia, therefore, dancer assembly 100 can apply a stable tension to blanket 44 even when blanket 44 undergoes high acceleration or deceleration, e.g., when blanket 44 has an unplanned immediate stop.

In such embodiments, the mass of roller 111 is proportional to the force applied to blanket 44. In case of the aforementioned immediate stop, a sufficiently-large mass of roller 111 (e.g., a few kilograms) may apply a sufficiently-large force to blanket 44, which may cause a mechanical damage, such as distortion and/or tearing thereof.

Typically, at least one of controllers 106 and 122 comprises a general-purpose controller, which is programmed in software to carry out the functions described herein. The software may be downloaded to the controller in electronic form, over a network, for example, or it may, alternatively or additionally, be provided and/or stored on non-transitory tangible media, such as magnetic, optical, or electronic memory.

The specific block diagram of dancer assembly 100 shown in FIG. 2 is simplified for the sake of conceptual clarity. Moreover, this configuration is depicted purely by way of example, in order to illustrate certain problems that are addressed by embodiments of the present invention and to demonstrate the application of these embodiments in enhancing the performance of such a digital printing system having an ITM. Embodiments of the present invention, however, are by no means limited to this specific sort of example configuration, and in alternative embodiments, the dancer assembly may comprise any additional or alternative suitable elements, so as to apply the specified tension to blanket 44.

In alternative embodiments, processor 20 may comprise or replace at least one of controllers 106 and 122. In such embodiments, processor 20 is configured to: (a) receive the pressure signal produced by pressure sensor 114, and drive blower 104 to obtain the target pressure described, for example, in the operational position, and/or (b) receive the position signal produced by position sensing assembly 112, and drive motor 120 to move chamber 103 to any of the suitable positions described above. Note that in these embodiments, processor 20 may hold a threshold indicative of the target tension, or may receive an electrical signal indicative of the target tension.

Figure 3:
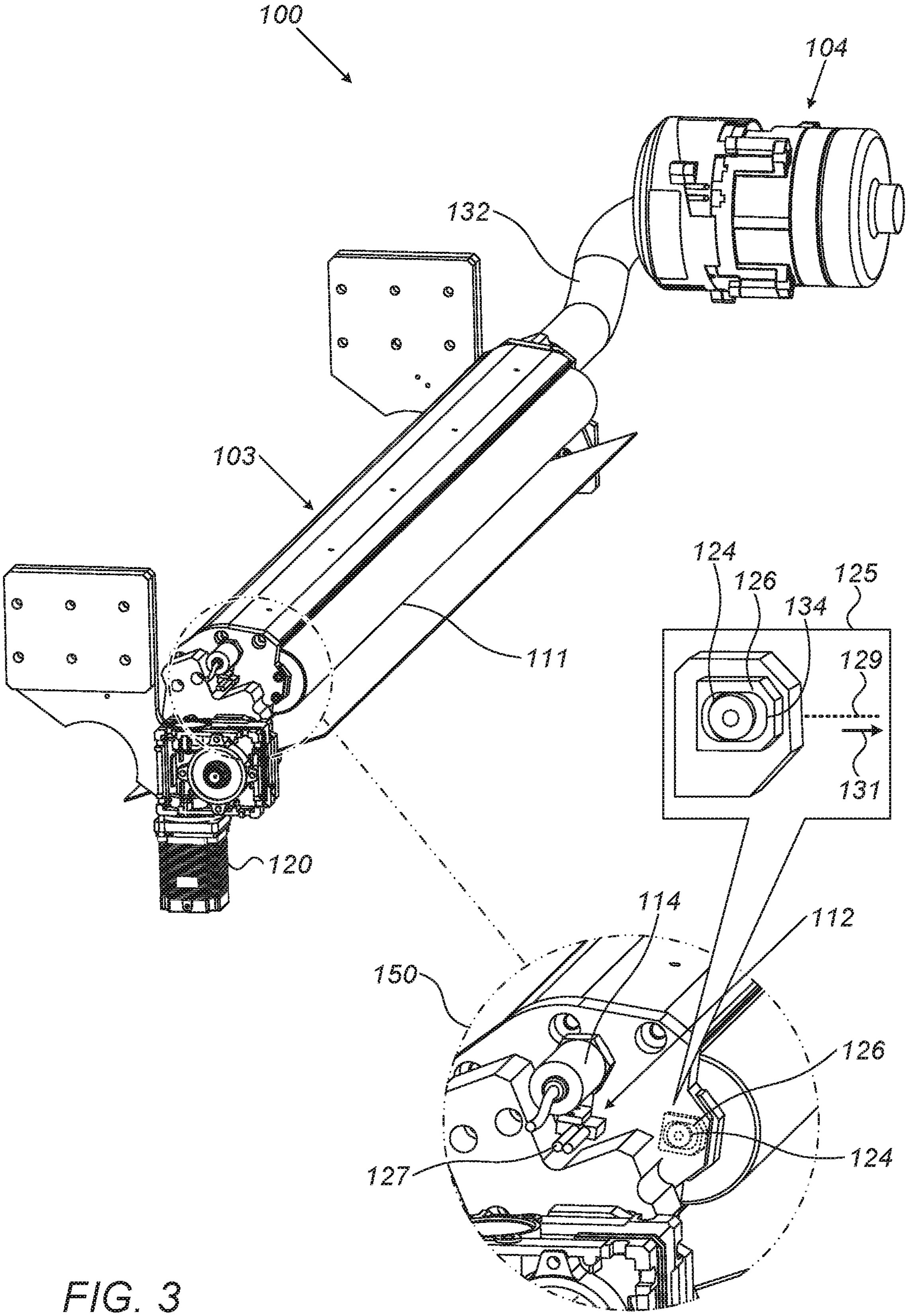
FIG. 3 is a schematic, pictorial illustration of a dancer assembly of a digital printing system, in accordance with an embodiment of the present invention.

FIG. 3 is a schematic, pictorial illustration of dancer assembly 100, in accordance with an embodiment of the present invention. In some embodiments, dancer assembly 100 comprises blower 104, inlet tube 132, chamber 103, roller 111 and motor 120 depicted in detail in FIG. 2 above.

In the example of FIG. 3, inlet tube 132 is configured to flow pressurized air 130, between blower 104 and chamber 103, at an exemplary temperature of 25° C., or at any other suitable temperature, such as the temperature of blanket 44 at impression station 84. The temperature may be controlled, e.g., by measuring and heating or cooling the pressurized air, or may flow at room temperature without heating or cooling the air. Moreover, inlet tube 132, may comprise a rigid structure, so that blower 104, inlet tube 132 and chamber 103 are moved as a single-rigid body by motor 120, as described in FIG. 2 above.

Reference is now made to an inset 150. In some embodiments, position sensing assembly 112 and pressure sensor 114 are coupled to chamber 103. Position sensing assembly 112 comprises any suitable number of optic fibers 127, which are configured to convey optical signals from a light source (not shown) to impinge on the surface of roller 111, and subsequently, to be sensed by the position sensor (not shown) as described in FIG. 2 above.

Reference is now made to an inset 125. In some embodiments, dancer assembly 100 comprises a motion limiter 126 having a trench surrounding a bearing 124 coupled to a shaft (not shown) of roller 111. Motion limiter 126 is configured to limit a lateral move of roller 111 along an axis 129. In the example of FIG. 3, roller 111 is retracted into fluid chamber 103, e.g., when dancer assembly 100 is in the blanket installation position.

In some embodiments, before moving into the operational position shown in FIG. 2 above, processor 20 activates the pressure loop by sending tension command 110 to controller 106, so as to increase the pressure of air 130. The increased pressure of air 130 causes the lateral move of roller 111 along axis 129, in a direction represented by an arrow 131, until bearing 124 runs into an edge 134 of the trench of motion limited 126 and stops the lateral move in the direction of arrow 131.

In some embodiments, position sensing assembly 112 sends to controller 106 a position signal indicating that bearing 124 is in physical contact with (or close proximity to) edge 134, and controller 106 sends a signal indicative of the position of bearing 124 to processor 20. In response to receiving the signal from controller 106, processor 20 activates the position loop by sending target position signals 128 to controller 122, which commands motor 120 to move at least chamber 103 to the operational position. When roller 111 makes physical contact with blanket 44, roller 111 is typically retracted into chamber 103, so that bearing 124 moves in a direction opposite to arrow 131.

In some embodiments, position sensing assembly 112 sends to controller 106 a position signal indicating that roller 111 has been retracted, and in response, controller 106 operates the pressure loop until the target tension and the roller tension are matched. At this point blanket 44 is ready to start the digital printing process described in FIG. 1 above.

In alternative embodiments, position sensing assembly 112 may be based on any other suitable sensing technique, such as but not limited to ultrasonic, confocal wavelength, triangulation surface, mechanical probing, magnetic, and reflective power.

This particular configuration of dancer assembly 100 is shown by way of example, in order to illustrate certain problems that are addressed by embodiments of the present invention and to demonstrate the application of these embodiments in enhancing the performance of such a system. Embodiments of the present invention, however, are by no means limited to this specific sort of example dancer assembly, and the principles described herein may similarly be applied to other sorts of apparatuses for stretching any type of media and/or for maintaining such media taut. The disclosed techniques may be applied to any suitable type of printing systems or to flexible conveyors of material transferring systems.

Figures 4A, 4B:
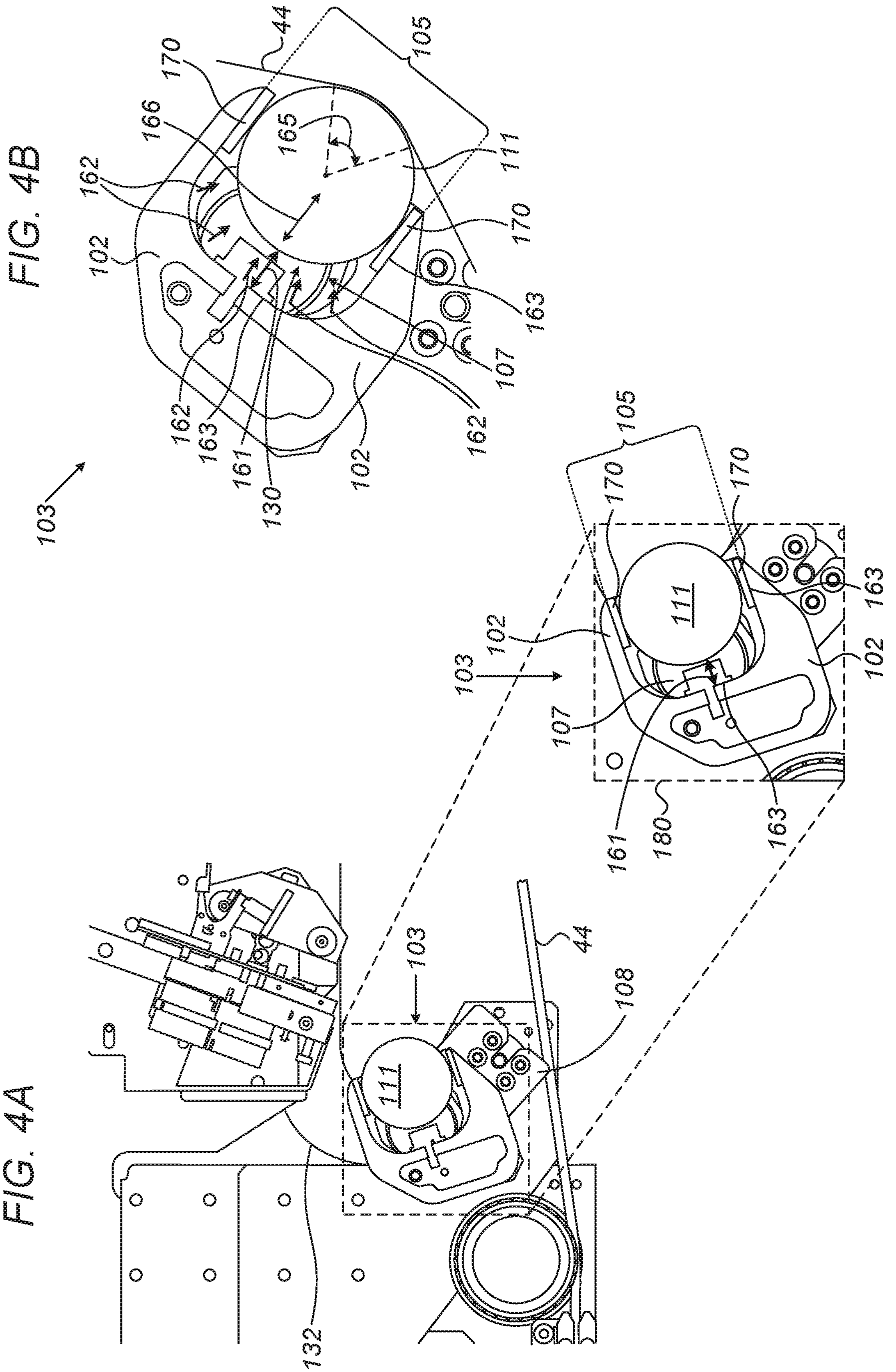
FIG. 4A is a sectional view of a dancer assembly in a blanket installation position, in accordance with an embodiment of the present invention.
FIG. 4B is a sectional view of a dancer assembly in an operational position, in accordance with an embodiment of the present invention.

FIG. 4A is a sectional view of dancer assembly 100 in the blanket installation position, in accordance with an embodiment of the present invention. In some embodiments, chamber 103 is moved by motor 120 and arm 108 away from blanket 44, such that roller 111 does not make physical contact with blanket 44.

Reference is now made to an inset 180. In some embodiments, chamber 103 comprises inlet 107, which is configured to flow pressurized air 130 into chamber 103 at any suitable temperature (e.g., 25°, 40°) as described in FIG. 2 above. Chamber 103 further comprises an inner wall 163 of housing 102.

In some embodiments, when dancer assembly 100 is in the blanket installation position, blower 104 is not blowing pressurized air 130 into chamber 103. Therefore, the surface of roller 111 is in contact with inner wall 163, or within a distance 161 therefrom.

In some embodiments, dancer assembly 100 comprises one or more sealing elements, referred to herein as a seal 170, which is coupled to inner wall 163, at opening 105, or disposed between opening 105 and roller 111 using any suitable technique. In some embodiments, seal 170 may comprise any suitable materials, such as but not limited to a sponge made from polyester, and an ultra-high molecular weight (UHMW) polyethylene tape bonded to the sponge surface. In some embodiments, seal 170 is configured to hold pressurized air 130 within chamber 103 and to reduce or eliminate friction between roller 111 and housing 102, as will be described in FIG. 4B below.

FIG. 4B is a sectional view of chamber 103 and roller 111 in the operational position, in accordance with an embodiment of the present invention. As described in FIG. 2 above, when the pressure loop is activated, blower 104 increases the pressure of air 130 flowing into chamber 103, so as to match between the target tension and the roller tension.

In some embodiments, pressurized air 103 applies force to roller 111, which is represented by arrows 162. Note that using pressurized air 130, or any other suitable fluid, applies a uniform force along the surface of roller 111. The uniform force prevents warp or any other distortion of roller **11*l* and maintains a uniform tension applied across blanket 111. In such embodiments, roller 111**, (that may have an exemplary diameter of about 62 mm, or any other suitable diameter) may have an exemplary weight between 250 grams and 450 grams, or any other suitable weight.

As described above, smaller mass of roller 1, or of any rotatable element, allows higher relative acceleration or deceleration of roller 111 without causing a mechanical damage to blanket 44. Moreover, by having a smaller mass of roller 111, dancer assembly 100 can obtain higher acceleration of roller 111 under constant pressure or force applied thereto. A motorized dancer with gear that can hold the same tension force with heavy roller that prevents substantial deflection, may have a weight of about 25 Kg. Therefore, in accordance with the present exemplary weights, dancer assembly 100 may accelerate roller 111 at about 78 times higher accelerations, without causing any deflection to roller 111.

In some embodiments, pressurized air 130 moves roller 111, along the direction of arrow 166, to further protrude from opening 105. As shown in FIG. 4B, in response to the increased pressure of air 130, distance 161 between the outer surface of roller 111 and inner wall 163 increases and is larger than distance 161 in the blanket installation position shown in FIG. 4A.

In some embodiments, seal 170 is configured to hold pressurized air 130 within chamber 103 at a predefined pressure having an exemplary pressure range between about 10 Kpa and about 15 Kpa. In an embodiment, when the predefined pressure is relatively low within this range (e.g., about 11 Kpa or 12 Kpa), seal 170 detaches, responsively, from roller 111 and some pressurized air 130 leaks between roller 111 and seal 170, so as to prevent friction between seal 170 and rotating roller 111, and yet, to retain the predefined pressure of pressurized air 130 within chamber 103. In another embodiment, when the predefined pressure is relatively high (e.g., about 14 Kpa or 14.5 Kpa), seal 170 is still detached (i.e., having an air gap) from roller 111 and a larger amount of pressurized air 130 leaks between roller 111 and seal 170, so as to retain (i) zero friction between seal 170 and rotating roller 111, and (ii) the predefined pressure. Note that the aforementioned pressure values are provided by way of example, and in other embodiments, any other suitable pressure or pressure range may be used. Moreover, the maximum pressure that can be generated with the higher leakage depends on the specification (e.g., the flow-pressure curve) of blower 104. Therefore, the maximal pressure of pressurized air 130 within chamber 103 is typically obtained when blower 104 operates at full power and depends on the type and configuration of seal 170.

In some embodiments, seal 170 is further configured to reduce or eliminate friction between roller 111 and inner walls 163 of opening 105, when blanket 44 rotates roller 111 in the operational position. In an embodiment, seal 170 makes contact with roller 111, in another embodiment, the design of dancer assembly 100 may incorporate an air gap between seal 170 and roller 111, so as to reduce or eliminate the friction between roller 111 and inner walls 163 of opening 105.

In the configuration of dancer assembly 100, the force applied to blanket 44 is determined by multiplying the length and diameter of roller 111, and the pressure in the fluid chamber. In an example embodiment, the 62 mm diameter and 1177 mm length of roller 111 and about 10 Kpa pressure of air 130 apply an exemplary specified force of 700 N to blanket 44. The resulting tension applied to blanket 44 is determined by the contact surface between roller 111 and blanket 44 corresponding to a predefined wrap angle 165 (e.g., 70°).

As described in FIG. 2 above, dancer assembly 100, which is based on pressurized air 130 or on any other suitable fluid, is configured to absorb shocks caused by any non-linear motion along blanket 44. In some embodiments, the fluid-based dancer assembly is configured to substantially isolate the upper run of blanket 44 from being affected by mechanical vibrations occurring in the lower run of blanket 44. In other words, dancer assembly 100 is configured to suppress at least some of the undesired mechanical vibrations produced during the operation of system 10. Therefore, dancer assembly 100 is configured to maintain blanket 44 taut and to assist in moving blanket 44 at the specified speed when passing adjacent to image forming station 60 and when entering impression station 84.

Moreover, the light weight of roller 111 may prevent mechanical damage to blanket 44 in case of high acceleration or deceleration of blanket 44, as described in detail in FIG. 2 above.

Figure 5:
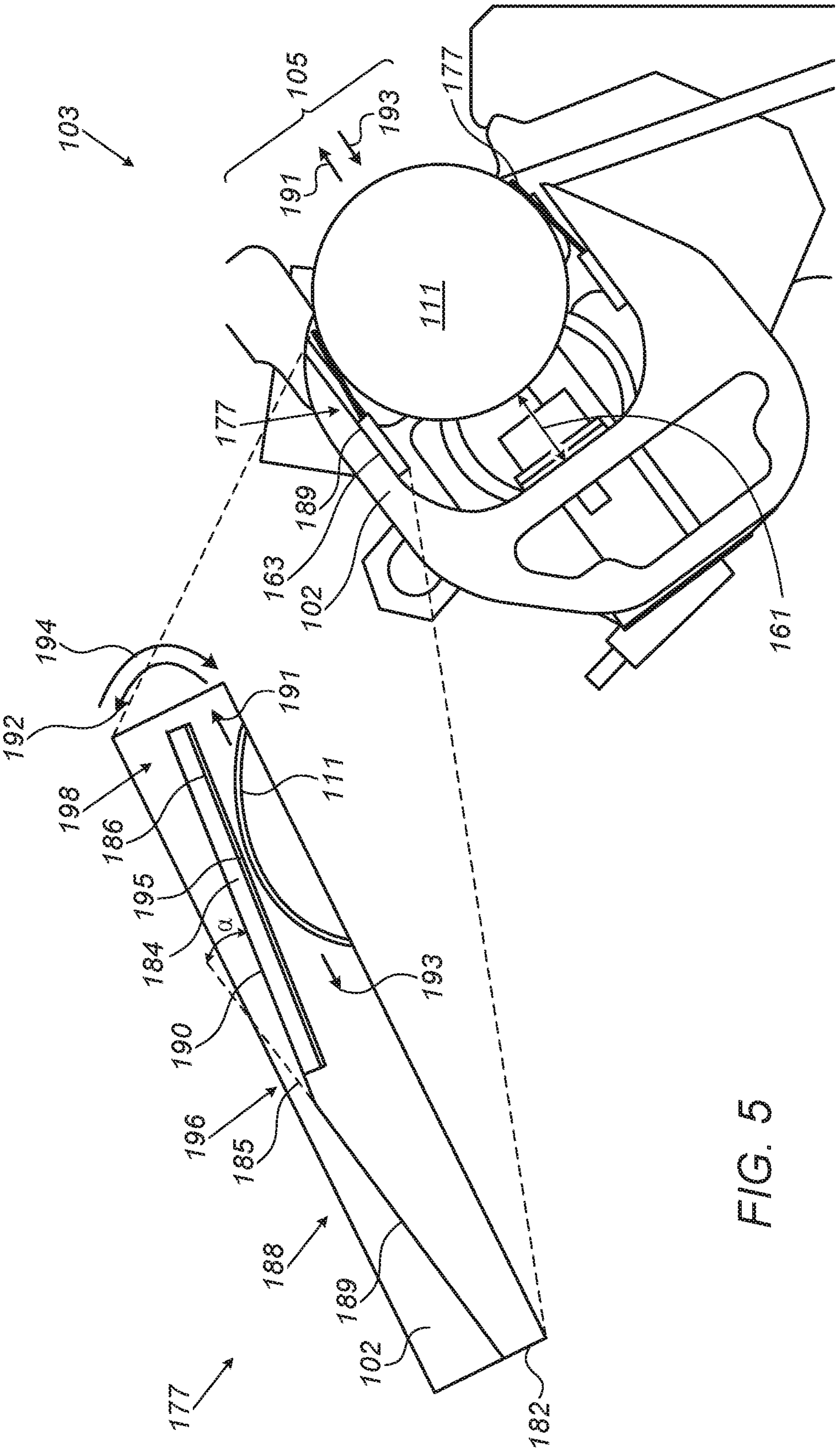
FIG. 5 is a sectional view of a dancer assembly having a spring-based seal, in accordance with an embodiment of the present invention.

FIG. 5 is a sectional view of dancer assembly 100 having a spring-based seal (SBS) 177, in accordance with an embodiment of the present invention.

In some embodiments, dancer assembly 100 comprises SBS 177, which is coupled to inner wall 163, instead of seal 170 shown in FIGS. 4A and 4B above. In the example of FIG. 5, SBS 177 is disposed between inner wall 163 of housing 102 and roller 111.

Reference is now made to an inset 182 showing a detailed structure of SBS 177. In some embodiments, SBS 177 comprises a leaf spring (LS) 188, typically made of stainless steel (SS), such as a SS 301 alloy, or any other suitable material, and having a thickness of about 0.2 mm or any other suitable thickness.

In the context of the present disclosure and in the claims, the terms “about” or “approximately” for any numerical values or range of numerical values, indicate a suitable dimensional tolerance that allows the part or collection of components, or a physical parameter such as thickness, to function for its intended purpose as described herein. More specifically, the term “about” or “approximately” may refer to the range of values ±20% of the recited value, e.g., “about 90%” may refer to the range of values from 71% to 99%.

In some embodiments, LS 188 comprises sections 189 and 190, wherein section 189 is coupled to inner wall 163 (shown in the general view of FIG. 5) of housing 102, and section 190 is bended at a bending angle $\alpha$ relative to a dashed line 185, which extends from section 189 and is indicative of the plain defined by section 189 and inner wall 163. In the present example, angle $\alpha$ has a nominal value of about 15 degrees with a tolerance of about +0.5 degree, but in other embodiments, angle $\alpha$ may have any other suitable angle with any other suitable tolerance.

In some embodiments, SBS 177 comprises a layer 184, which is coupled to section 190 of LS 188, and is configured to hold pressurized air 130 within chamber 103 and to reduce or eliminate friction between roller 111 and housing 102.

In some embodiments, layer 184 comprises polyurethane foam such as Poron® 4701-30, also referred to herein as a sponge, having a thickness of about 1 mm or any other suitable thickness. In other embodiments, layer 184 may comprise one or more sub-layers made of any other material (s) suitable for holding pressurized air 130 within chamber 103 and for reducing the friction between roller 111 and layer 184.

In some embodiments, SBS 177 comprises a tape 186, which is bonded to layer 184 and comprising UHMW polyethylene tape or polytetrafluoroethylene (PTFE) also referred to as Teflon™, or any other material suitable for holding pressurized air 130 within chamber 103 and for reducing the friction between roller 111 and housing 102.

In some embodiments, during the operation of dancer assembly 100, in response to applying increased pressurized air 130, roller 111 moves in a direction 191 toward a distal-end 198 of SBS 177 and section 190 bends in a direction 192 that reduces angle $\alpha$. Similarly, when reducing the pressure of pressurized air 130, roller 111 moves in a direction 193 toward a proximal-end 196 of SBS 177 and section 190 bends in a direction 194 that increases angle $\alpha$.

In some embodiments, when dancer assembly 100 operates at a predefined (i.e., constant) pressure of pressurized air 130 within chamber 103, and during the operation of system 10 the tension applied to blanket 44 is fluctuating or changing to a different constant tension, roller 111 is configured to move in direction 191 or 193 in response to the change in tension. For example, when roller 111 moves in direction 191, a larger portion of section 190 is exposed to pressurized air 130, so that section 190 bends in direction 192, and thereby reduces angle $\alpha$, and vice versa when roller 111 moves in direction 193 in response to a change of tension applied to blanket 44, so that section 190 bends in direction 194, and thereby increases angle $\alpha$. Note that based on the mechanism described above, when roller 111 moves in direction 191 or 193, dancer assembly 100 is configured to maintain: (i) the predefined pressure of pressurized air 130 within chamber 103 and, (ii) the aforementioned air gap between seal 170 and roller 111, so as to eliminate any friction between seal 170 and rotating roller 111.

In some embodiments, a point 195, which is indicative of the closest proximity between roller 111 and tape 186 of SBS 177, moves together with the motion of roller 111. Note that when applying pressurized air 130, roller 111 and tape 186 are not making physical contact with one another at point 195, and typically retain a distance of about 0.2 mm apart from one another, which allows maintaining the aforementioned specified pressure of pressurized air within chamber 103 and prevents or reduces friction between roller 111 and layer 184. In other words, in response to a change in the pressure of pressurized air 130, section 190 moves relative to roller 111 such that tape 186 is positioned at the aforementioned distance (or at any other suitable settable distance) from the outer surface of roller 111. By preventing friction, the disclosed techniques prevent erosion of at least one of tape 186 and roller 111, when roller 111 is rotating. In the absence of pressurized air 130 or at a pressure smaller than or equal to a predefined pressure level, roller 111 is typically not rotating about its axis, in which case roller 111 and tape 186 may have physical contact with one another at point 195.

In some embodiments, based on the flexibility of LS 188, SBS 177 is configured to operate at a broad range of pressurized air 130, so that roller 111 or tape 186 are not eroding when applying low pressure, and the specified leak of air and pressure are maintained also at increased pressure of air 130. Moreover, the disclosed techniques enable continuous operation and working conditions at different levels of pressurized air 130, by moving roller 111 and section 190 relative to one another.

The configuration and specified dimensions and pressure described above are depicted purely by way of example. In alternative embodiments, dancer assembly 100 and chamber 103 may have any other suitable configuration and dimensions, and may operate using any other suitable specified conditions.

Although the embodiments described herein mainly address digital printing using a flexible ITM, the methods and systems described herein can also be used in other applications, such as in digital printing by applying ink directly to a flexible target substrate (e.g., by jetting), in controlling tension applied to any type of flexible member and in any system comprising a conveyor having a flexible media, e.g., in the machinery and/or food industries.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital printing system, comprising:
a flexible intermediate transfer member (ITM), which is configured to receive ink droplets from an ink supply system to form an image thereon, and to transfer the image to a target substrate; and
a dancer assembly, comprising a fluid chamber and a rotatable element fitted in the fluid chamber, the fluid chamber comprising an inlet configured to receive pressurized fluid into the fluid chamber, wherein the pressurized fluid causes the rotatable element to move relative to the fluid chamber and to apply tension to the ITM while being rotated by the ITM.

2. The system according to claim 1, and comprising a processor, which is configured to control movement of the rotatable element, including:
choosing between at least a first position and a second position of the dancer assembly;
in the first position, moving at least the fluid chamber relative to the ITM; and
in the second position, moving at least the rotatable element relative to the fluid chamber.

3. The system according to claim 1, and comprising a fluid compressor, which is configured to supply the pressurized fluid into the fluid chamber through the inlet.

4. The system according to claim 3, and comprising a processor, which is configured to: (a) calculate, based on an indication of the tension applied to the ITM, a target pressure that, when applied to the pressurized fluid, causes the rotatable element to apply the tension to the ITM, and (b) control the fluid compressor to supply the pressurized fluid at the target pressure, into the fluid chamber.

5. The system according to claim 4, and comprising a pressure sensor, which is configured to produce a pressure signal indicative of a present pressure of the pressurized fluid in the fluid chamber, wherein the processor is configured, based on the pressure signal, to control the fluid compressor to match the present pressure to the target pressure.

6. The system according to claim 4, wherein the pressurized fluid comprises pressurized air, and wherein the fluid compressor comprises an air blower, configured to supply the pressurized air.

7. The system according to claim 1, and comprising a position sensing assembly, which is configured to produce a position signal indicative of a position of the rotatable element relative to a predetermined reference point.

8. The system according to claim 7, wherein the processor is configured, based on the position signal, at least one of: (a) to control the a motor to move at least the fluid chamber relative to the ITM, and (b) to control a fluid compressor to move at least the rotatable element along an axis of the fluid chamber by controlling a pressure of the pressurized fluid.

9. The system according to claim 1, wherein the rotatable element comprises a roller.

10. The system according to claim 1, and comprising a motor, which is configured to move at least the fluid chamber relative to the ITM, and wherein, at least in the first position, the processor is configured to control the motor to move at least the fluid chamber relative to the ITM.

11. The system according to claim 1, and comprising an opening, which is sized and shaped to fit snugly over the rotatable element, wherein the pressurized fluid causes the rotatable element to protrude from the fluid chamber via the opening.

12. The system according to claim 11, and comprising a seal, which is coupled to the opening, and is configured to hold the pressurized fluid within the fluid chamber when a pressure of the pressurized fluid is smaller than or equal to a predefined pressure, and to release at least part of the pressurized fluid out of the fluid chamber when the pressure exceeds the predefined pressure.

13. The system according to claim 12, wherein the seal is configured to reduce friction between the rotatable element and walls of the opening.

14. The system according to claim 12, wherein the seal comprises a leaf spring having first and second sections, wherein the first section is coupled to a wall of the opening, and wherein the second section is configured to release at least part of the pressurized fluid out of the fluid chamber by moving relative to the rotatable element.

15. The system according to claim 14, wherein the second section is configured to move in response to a change in a position of the rotatable element.

16. The system according to claim 14, wherein the leaf spring comprises stainless steel, and wherein, in response to a change in a position of the rotatable element, the second section is configured to bend relative to the first section.

17. The system according to claim 1, wherein the pressurized fluid causes the rotatable element to move along an axis of the fluid chamber, and wherein, at a point of contact between the ITM and the rotatable element, the axis of the fluid chamber is orthogonal to a movement axis of the ITM.

18. A method, comprising:
in a digital printing system comprising (a) a flexible intermediate transfer member (ITM), and (b) a dancer assembly, comprising a fluid chamber and a rotatable element fitted in the fluid chamber, the fluid chamber comprising an inlet for receiving pressurized fluid into the fluid chamber, applying, by the rotatable element, a tension to the ITM, by supplying the pressurized fluid into the fluid chamber and causing the rotatable element to move relative to the fluid chamber;
forming an image on the ITM by receiving ink droplets from an ink supply system; and
transferring the image to a target substrate.

19. A method, comprising:
in a digital printing system comprising (a) a flexible target substrate, and (b) a dancer assembly, comprising a fluid chamber and a rotatable element fitted in the fluid chamber, the fluid chamber comprising an inlet for receiving pressurized fluid into the fluid chamber, applying, by the rotatable element, a predefined tension to the flexible target substrate, by supplying the pressurized fluid into the fluid chamber and causing the rotatable element to move relative to the fluid chamber; and
forming an image on the flexible target substrate by receiving ink droplets from an ink supply system.

20. An apparatus for controlling tension applied to a flexible member, the apparatus comprising:
a substrate comprising the flexible member; and
a dancer assembly, comprising a fluid chamber and a rotatable element fitted in the fluid chamber, the fluid chamber comprising an inlet configured to receive pressurized fluid into the fluid chamber, wherein the pressurized fluid causes the rotatable element to move relative to the fluid chamber and to apply tension to the substrate while being rotated by the substrate.

* * * * *